(12) United States Patent
Kukreja

(10) Patent No.: US 10,520,321 B1
(45) Date of Patent: Dec. 31, 2019

(54) ROUTE SAFETY SCORE

(71) Applicant: Lytx, Inc., San Diego, CA (US)

(72) Inventor: Muskan Kukreja, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/965,018

(22) Filed: Dec. 10, 2015

(51) Int. Cl.
*G01C 21/34* (2006.01)
*G08G 1/123* (2006.01)

(52) U.S. Cl.
CPC .............. *G01C 21/34* (2013.01); *G08G 1/123* (2013.01)

(58) Field of Classification Search
CPC ..................................................... G01C 21/34
USPC ......................................................... 701/532
See application file for complete search history.

(56) References Cited

U.S. PATENT DOCUMENTS

| | | | | |
|---|---|---|---|---|
| 5,331,561 | A * | 7/1994 | Barrett ................... | G05D 1/024 340/903 |
| 6,882,923 | B2 * | 4/2005 | Miller ................ | B60K 31/0008 180/169 |
| 8,606,512 | B1 * | 12/2013 | Bogovich .............. | G06Q 40/08 701/423 |
| 8,996,303 | B1 * | 3/2015 | Bogovich .............. | G06Q 40/08 701/423 |
| 2005/0137757 | A1 * | 6/2005 | Phelan ................... | G01M 17/00 701/1 |
| 2007/0288132 | A1 * | 12/2007 | Lam ...................... | G05D 1/0278 701/23 |
| 2008/0320087 | A1 * | 12/2008 | Horvitz ................. | H04L 67/125 709/206 |
| 2009/0234859 | A1 * | 9/2009 | Grigsby ................. | G08G 1/161 |
| 2010/0188265 | A1 * | 7/2010 | Hill ....................... | G08G 1/0112 340/905 |
| 2010/0256852 | A1 * | 10/2010 | Mudalige ............... | G08G 1/163 701/24 |
| 2010/0317420 | A1 * | 12/2010 | Hoffberg ............ | G06Q 30/0207 463/1 |
| 2012/0109418 | A1 * | 5/2012 | Lorber ................... | G06Q 10/00 701/1 |
| 2013/0046562 | A1 * | 2/2013 | Taylor .................... | G06Q 40/00 705/4 |
| 2013/0073112 | A1 * | 3/2013 | Phelan ................... | G06Q 40/00 701/1 |
| 2013/0173114 | A1 * | 7/2013 | Pillai .................... | B62D 15/026 701/41 |
| 2013/0304515 | A1 * | 11/2013 | Gryan .................... | G06Q 40/08 705/4 |
| 2015/0168174 | A1 * | 6/2015 | Abramson .......... | G01C 21/3697 701/408 |
| 2015/0294422 | A1 * | 10/2015 | Carver ................... | G07C 5/008 705/4 |
| 2016/0041560 | A1 * | 2/2016 | Pillai .................... | B62D 15/026 701/26 |
| 2016/0086285 | A1 * | 3/2016 | Jordan Peters ........ | G06Q 40/08 705/4 |
| 2016/0171521 | A1 * | 6/2016 | Ramirez ............ | G06Q 30/0224 701/409 |

(Continued)

*Primary Examiner* — Jelani A Smith
*Assistant Examiner* — Majdi Alsomiri
(74) *Attorney, Agent, or Firm* — Van Pelt, Yi & James LLP

(57) ABSTRACT

A system for scoring route safety includes and input interface and a processor. The input interface is to receive data associated with a route segment. The data includes a speed data. The processor is to determine a segment safety score using a speed distribution. The speed distribution is based at least in part on the speed data.

16 Claims, 8 Drawing Sheets

(56) References Cited

U.S. PATENT DOCUMENTS

2016/0205238 A1* 7/2016 Abramson ......... G01C 21/3484
455/456.4

* cited by examiner

ROUTE SAFETY SCORE

BACKGROUND OF THE INVENTION

Typically, it is difficult to determine how safe a route is that is taken while driving from point A to point B. Even more so in the event that a driver has no experience traveling the route.

BRIEF DESCRIPTION OF THE DRAWINGS

Various embodiments of the invention are disclosed in the following detailed description and the accompanying drawings.

DETAILED DESCRIPTION

Figure 1:
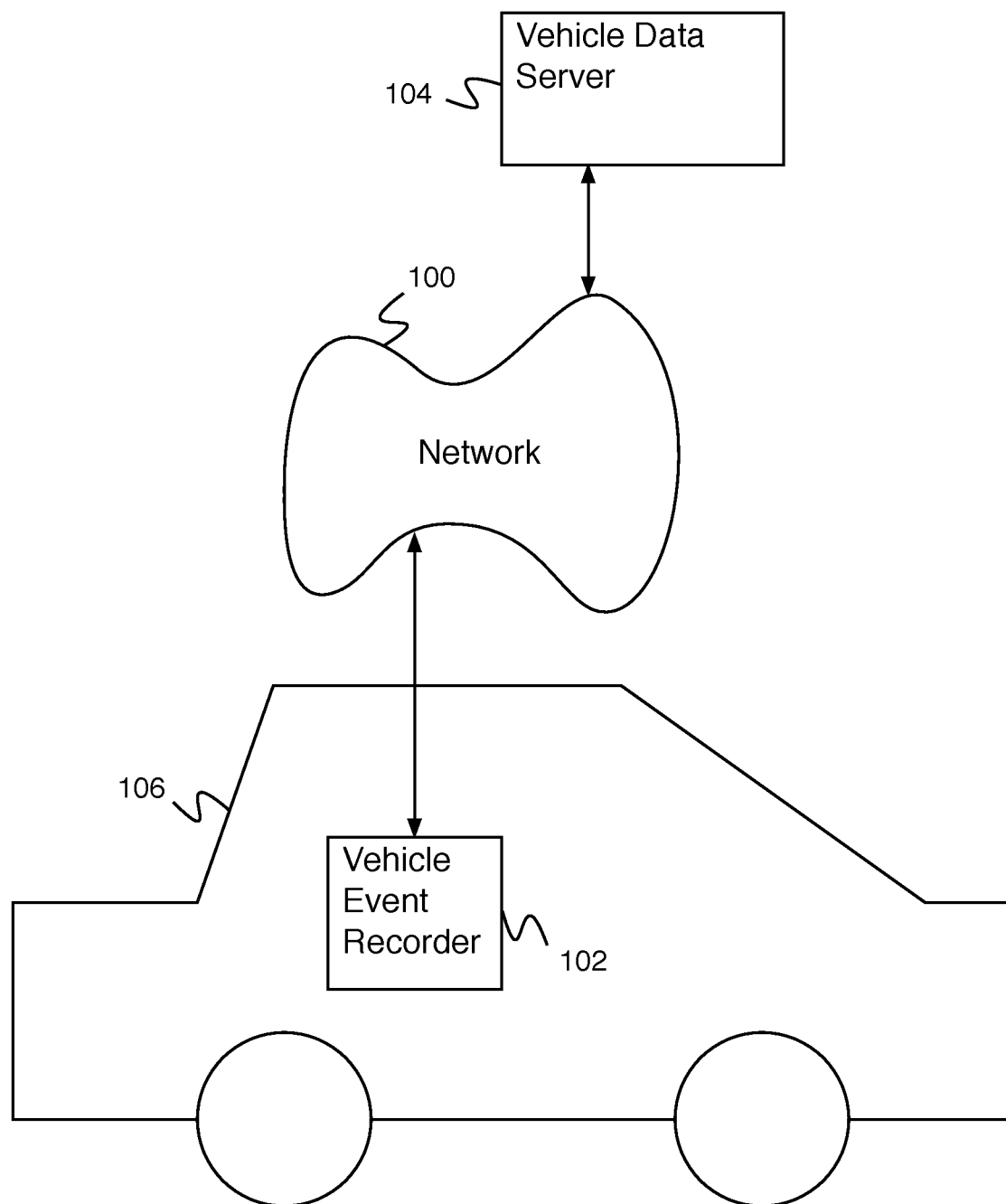
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for scoring route safety comprises an input interface to receive data associated with a route segment, wherein the data comprises a speed data, and a processor to determine a segment safety score using a speed distribution, wherein the speed distribution is based at least in part on the speed data. In some embodiments, the system for scoring route safety additionally comprises a memory coupled to the processor and configured to provide the processor with instructions.

In some embodiments, a system for scoring route safety receives a set of speed data. The set of speed data comprises data describing vehicle speeds at road locations. In some embodiments, the speed data comprises data measured by one or more vehicle event recorders measuring vehicle speed. The system for scoring route safety receives map data including a set of route segments. In some embodiments, route segments comprise short road segments (e.g., one quarter mile, one kilometer, one mile, one block, one freeway exit, etc.). The system for scoring route safety determines a safety score associated with each route segment. In some embodiments, the safety score is based at least in part on a speed distribution of speed data within the route segment. In some embodiments, a speed distribution comprises a standard deviation of measured speeds within the route segment. In various embodiments, the safety score is based on event data, maneuver data, video data, lane change frequency data, climate data, topology data, road data, lane configuration data, speed data, or any other appropriate data.

In some embodiments, the system for scoring route safety receives a starting point and a destination point for a route and determines one or more possible routes to travel from the starting point to the destination point. The system determines the set of route segments comprised by each possible route and determines the route segment safety score associated with each route segment. A route safety score for each route can then be determined by combining the route segment safety scores associated with the route. The system for scoring route safety can then determine a preferred route of the one or more possible routes based at least in part on the route safety scores. In various embodiments, a route is determined based on route safety scores, route driving times, traffic, driver preferences, or any other appropriate criteria.

FIG. 1 is a block diagram illustrating an embodiment of a system including a vehicle event recorder. In the example shown, vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for determining risky events.

Figure 2:
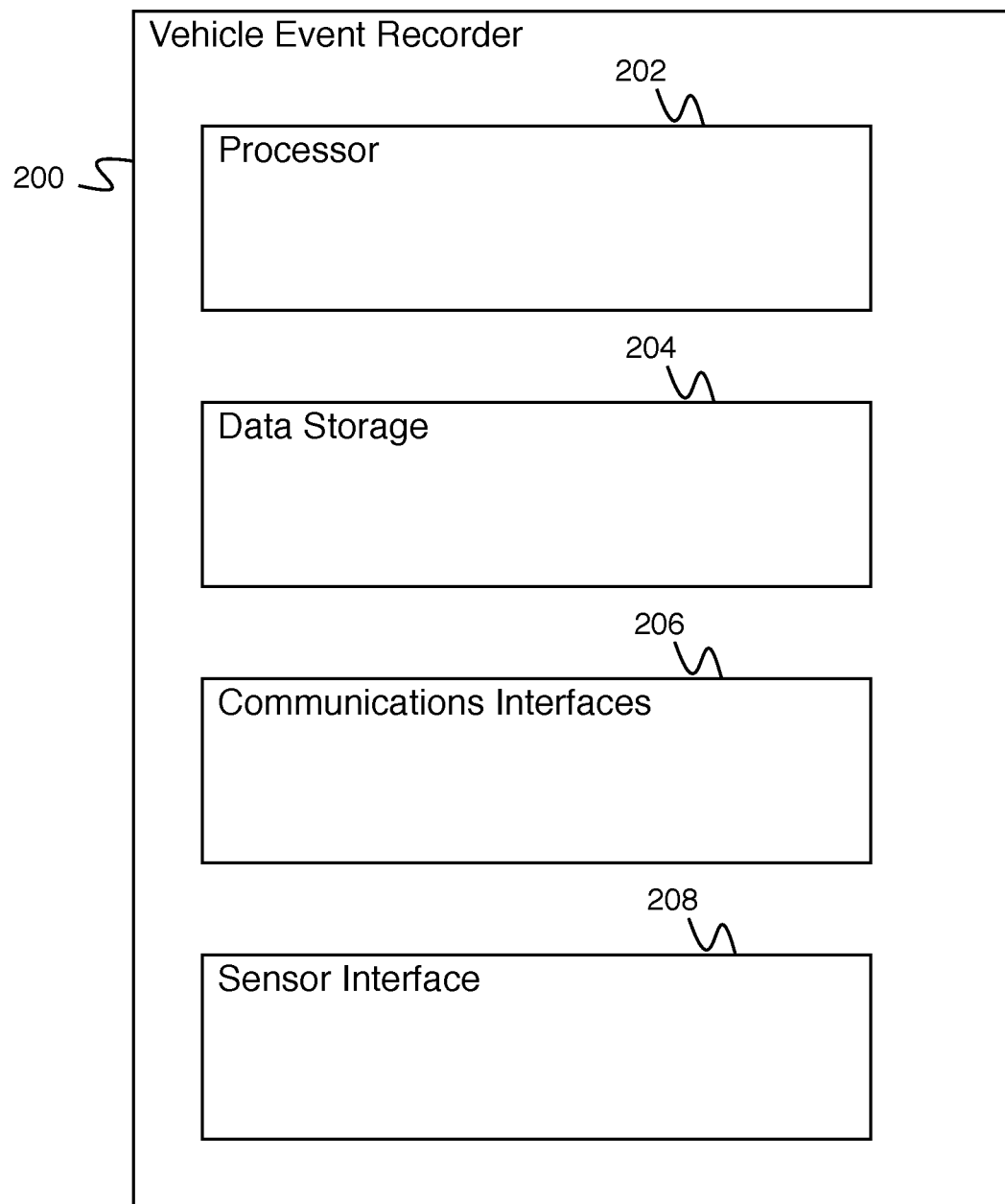
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. In various embodiments, processor 202 comprises a processor for determining a vehicle characterization, determining a vehicle identifier, determining a maintenance item, or for any other appropriate purpose. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus. In some embodiments, vehicle event recorder 200 communicates with a vehicle data server via communications interfaces 206. In various embodiments, vehicle event recorder 200 transmits vehicle state sensor data, accelerometer data, speed data, maneuver data, audio data, video data, event data, or any other appropriate data to the vehicle data server. In some embodiments, vehicle event recorder 200 receives an indication of a route from the vehicle data server. In some embodiments, vehicle event recorder 200 receives a set of route segment safety scores from the vehicle data server and determines a route based at least in part on the set of route segment safety scores.

Figure 3:
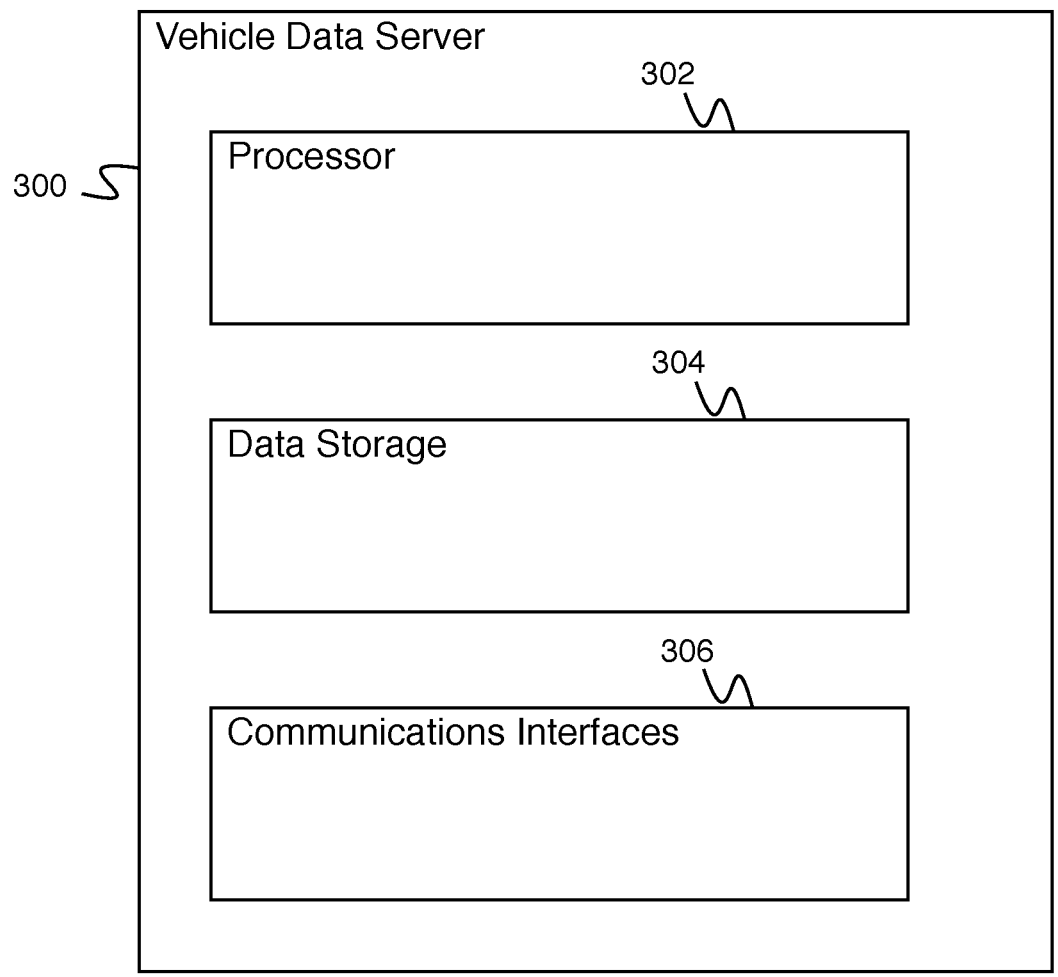
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises processor 302. In various embodiments, processor 302 comprises a processor for determining a route, determining a set of route segments, determining a route segment safety score, collecting speed data, determining a speed distribution, or for any other appropriate purpose. Data storage 304 comprises a data storage (e.g., a random access memory (RAM), a read only memory (ROM), a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, machine learning algorithm data, or any other appropriate data. In various embodiments, communications interfaces 306 comprises one or more of a GSM interface, a CDMA interface, a WiFi interface, an Ethernet interface, a USB interface, a Bluetooth interface, an Internet interface, a fiber optic interface, or any other appropriate interface. In various embodiments, vehicle data server 300 receives events, maneuvers, data, or any other appropriate information from one or more vehicle event recorders. In some embodiments, vehicle data server 300 determines a route based at least in part on a route safety score and communicates the route to one or more vehicle event recorders. In some embodiments, vehicle data server 300 determines a set of route segment safety scores and communicates the set of route segment safety scores to one or more vehicle event recorders.

Figure 4:
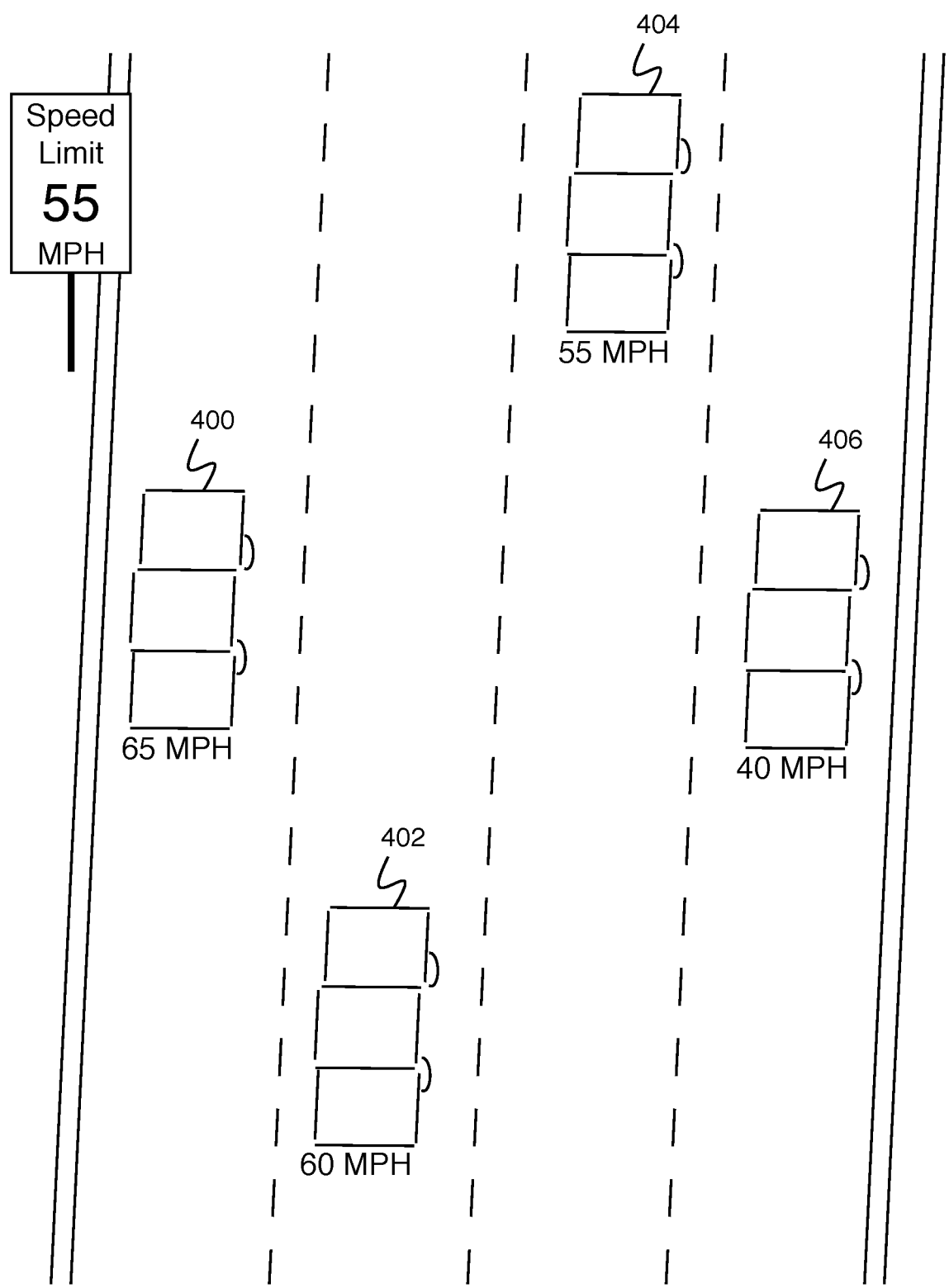
FIG. 4 is a diagram illustrating an embodiment of vehicles on a road segment.

FIG. 4 is a diagram illustrating an embodiment of vehicles on a road segment. In the example shown, four vehicles are traveling on a freeway. In some embodiments, vehicles typically move at approximately the same speed. In some embodiments, vehicles typically move at different speeds. In the example shown, vehicle 400 moves at 65 MPH on the freeway, vehicle 402 moves at 60 MPH, vehicle 404 moves at 55 MPH, and vehicle 406 moves at 40 MPH. In some embodiments, each vehicle comprises a vehicle event recorder that reports its speed to a vehicle data server. In some embodiments, a vehicle data server collects speed data from vehicles traveling on the road segment to determine a speed distribution. In some embodiments, a speed distribution comprises a standard deviation of speed data. In various embodiments, a speed distribution comprises a speed distribution of all vehicles on the road segment at a given time, a speed distribution of typical vehicle speed across time, a speed distribution of typical vehicle speed across the road segment, a speed distribution of all speed data recorded for the road segment, or any other appropriate speed distribution.

Figure 5:
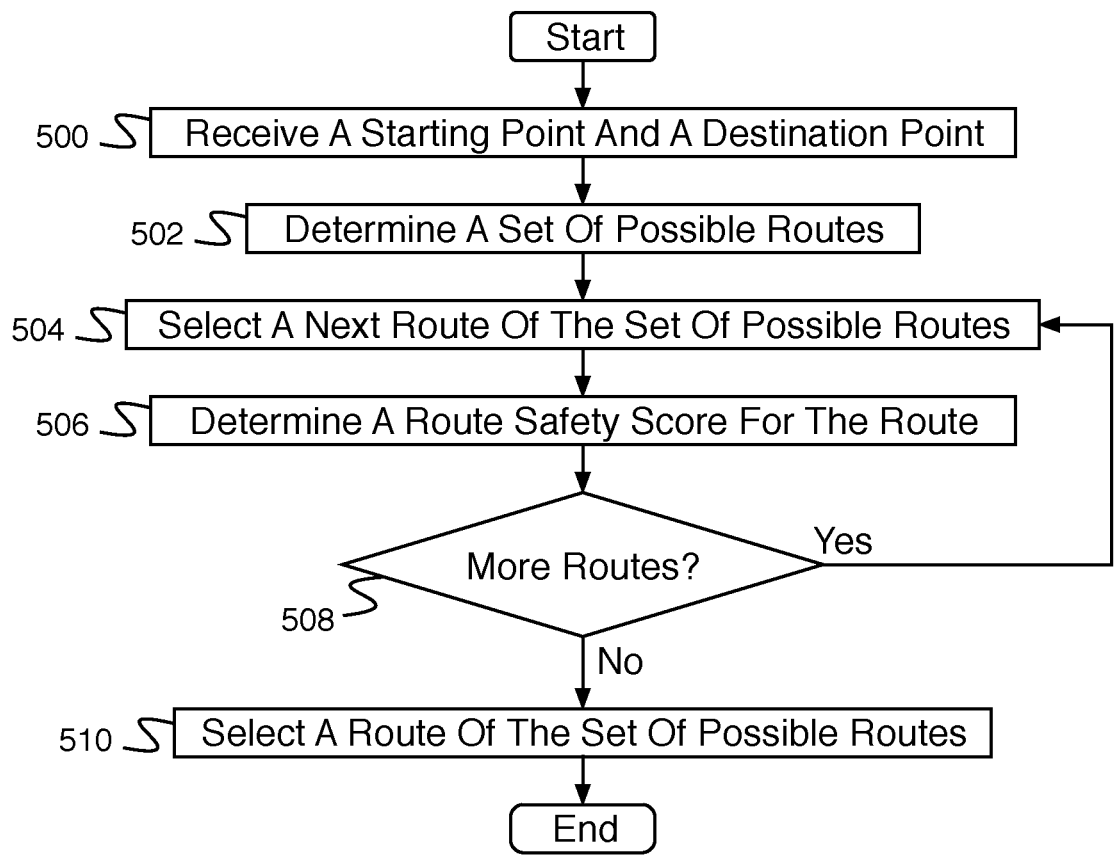
FIG. 5 is a flow diagram illustrating an embodiment of a process for determining a route based at least in part on a safety score.

FIG. 5 is a flow diagram illustrating an embodiment of a process for determining a route based at least in part on a safety score. In some embodiments, the process of FIG. 5 is executed by a vehicle data server (e.g., vehicle data server 104 of FIG. 1). In some embodiments, the process of FIG. 5 is executed by a vehicle event recorder (e.g., vehicle event recorder 102 of FIG. 1). In the example shown, in 500, a starting point and a destination point are received. In various embodiments, a starting point and a destination point are received from a driver, from a system administrator, from a route plan, or from any other appropriate source. In 502, a set of possible routes is determined. In various embodiments, the set of possible routes comprises all possible routes, all possible routes under a timing threshold, all possible routes within a desired region, or any other appropriate set of possible routes. In 504, a next route of the set of possible routes is selected. In some embodiments, the next route comprises the first route. In 506, a route safety score for the route is determined. In 508, it is determined whether there are more routes (e.g., of the set of possible routes). In the event there are more routes, control passes to 504. In the event there are not more routes, control passes to 510. In 510, a route of the set of possible routes is selected. In some embodiments, the route with the route safety score indicating the route is safest is selected. In some embodiments, a lower route safety score indicates a safer route, and the route with the lowest route safety score is selected. In various embodiments, the route is selected based on route safety scores, route driving times, traffic, driver preferences, or any other appropriate criteria.

Figure 6:
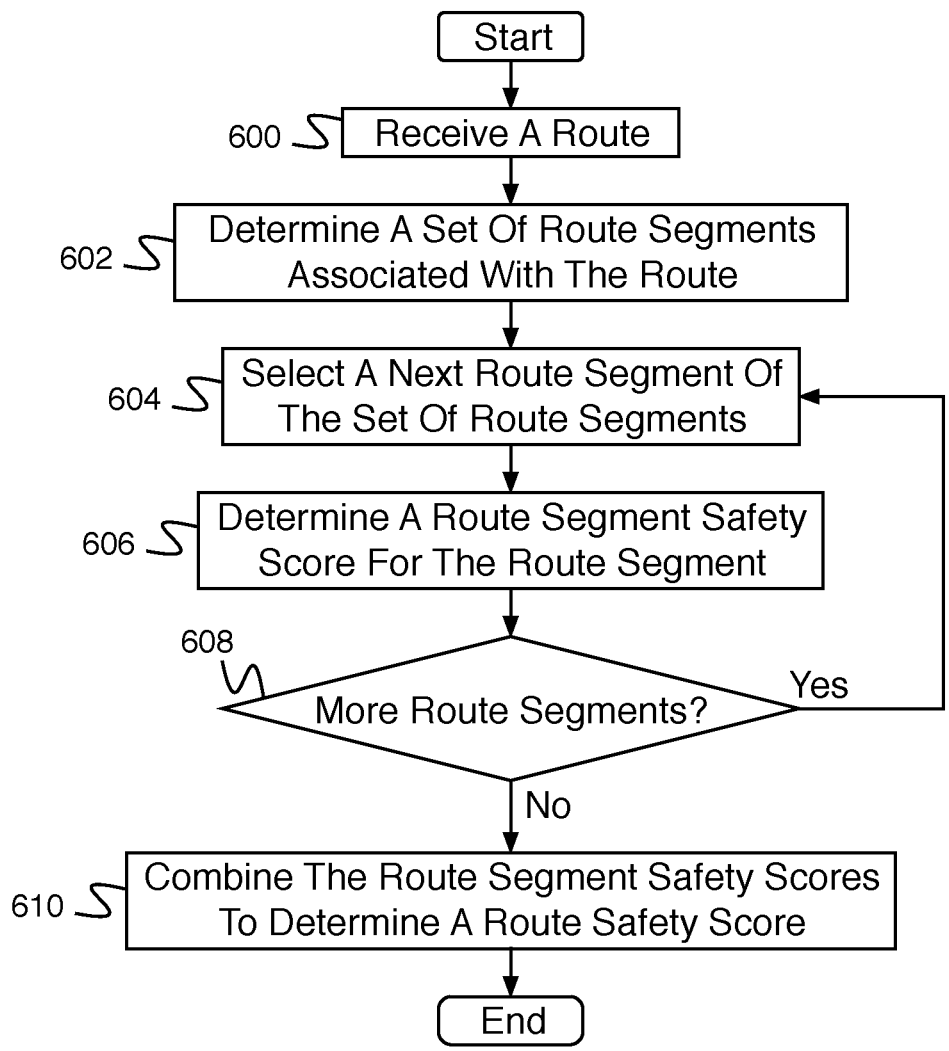
FIG. 6 is a flow diagram illustrating an embodiment of a process for determining a route safety score for a route.

FIG. 6 is a flow diagram illustrating an embodiment of a process for determining a route safety score for a route. In some embodiments, the process of FIG. 6 implements 506 of FIG. 5. In the example shown, in 600, a route is received. In some embodiments, a route comprises a start point, an end point, and a path from the start point to the end point. In 602, a set of route segments associated with the route is determined. In some embodiments, the set of route segments comprises the set of route segments along the path from the start point to the end point. In 604, a next route segment of the set of route segments is selected. In some embodiments, the first route segment of the set of route segments is selected. In 606, a route segment safety score for the route segment is determined. In some embodiments, determining a route segment safety score for the route segment comprises determining a route segment safety score using speed data. In some embodiments, determining a route segment safety score using speed data is performed by a vehicle data server. The vehicle data server stores determined route segment safety scores in a route segment safety score database. In some embodiments, the route segment safety score database is transmitted to a vehicle event recorder and the process of FIG. 6 is performed by a vehicle event recorder. In some embodiments, determining a route segment safety score comprises looking up a route segment safety score for the route segment in a safety score database. In 608, it is determined whether there are more route segments (e.g., of the set of route segments). In the event it is determined that there are more route segments, control passes to 604. In the event it is determined that there are not more route segments, control passes to 610. In 610, the route segment safety scores are combined to determine a route safety score. In some embodiments, combining the route segment safety scores comprises adding the route segment safety scores.

Figure 7:
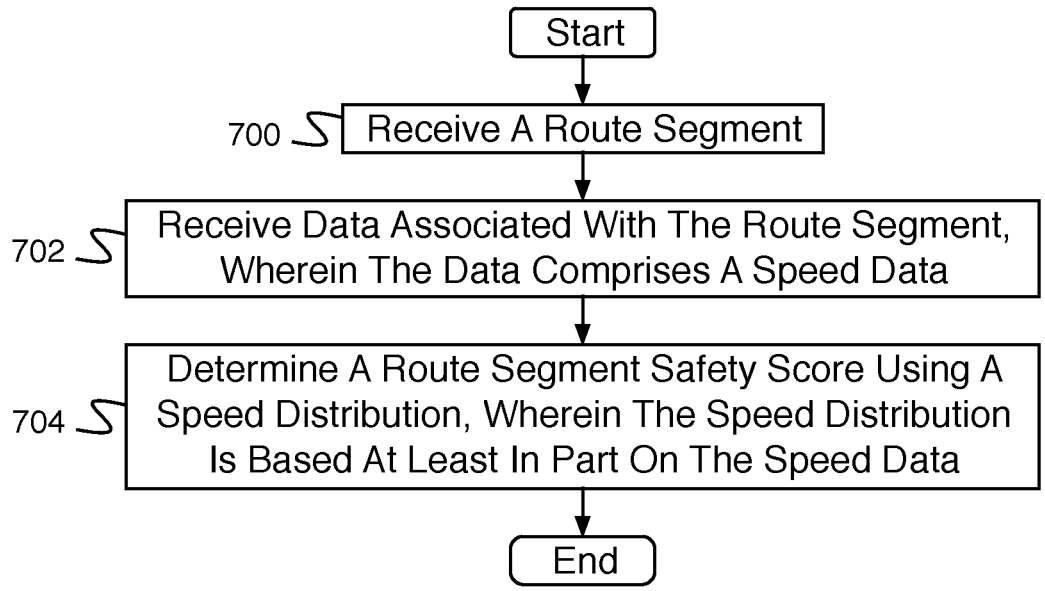
FIG. 7 is a flow diagram illustrating an embodiment of a process for determining a route segment safety score using speed data.

FIG. 7 is a flow diagram illustrating an embodiment of a process for determining a route segment safety score using speed data. In some embodiments, the process of FIG. 7 implements 606 of FIG. 6. In some embodiments, the process of FIG. 7 is executed by a vehicle data server. In the example shown, in 700, a route segment is received. In some embodiments, a route segment comprises an indication of a route segment (e.g., a route segment indicator). In 702, data associated with the route segment is received, wherein the data comprises a speed data. In some embodiments, receiving data associated with the route segment comprises retrieving vehicle data from a vehicle database. In some embodiments, data is associated with a plurality of vehicles. In some embodiments, data comprises data received at a plurality of locations within the segment. In some embodiments, data comprises data received at a plurality of times of day. In various embodiments, data comprises one or more of the following (e.g., in addition to a speed data): events, maneuvers, video data, lane change frequency, climate data, topology data, road data, number of lanes, or any other appropriate data. In 704, a route segment safety score is determined using a speed distribution, wherein the speed distribution is based at least in part on the speed data. In some embodiments, the speed data comprises a set of vehicle speeds (e.g., vehicle speeds received from vehicle event recorders), and the speed distribution is determined from the speed data (e.g., by determining the standard deviation of the speed data). In some embodiments, the speed data comprises the speed distribution.

Figure 8:
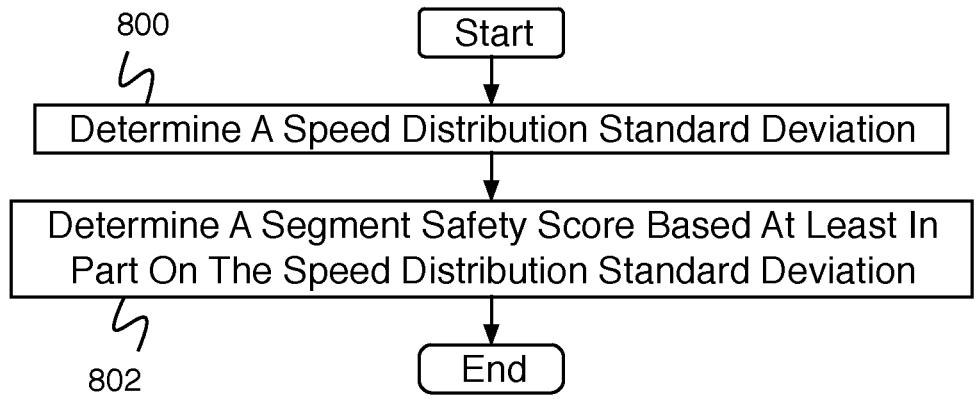
FIG. 8 is a flow diagram illustrating an embodiment of a process for determining a route segment safety score using a speed distribution.

FIG. 8 is a flow diagram illustrating an embodiment of a process for determining a route segment safety score using a speed distribution. In some embodiments, the process of FIG. 8 implements 704 of FIG. 7. In the example shown, in 800, a speed distribution standard deviation is determined. In some embodiments, a speed distribution standard deviation is determined from speed data using the well-known formula (e.g., range or standard deviation or function of maximum speed and minimum speed, etc.). In some embodiments, a speed distribution standard deviation is received. In 802, a segment safety score is determined based at least in part on the speed distribution standard deviation. In some embodiments, determining a segment safety score comprises scaling the speed distribution standard deviation by a constant (e.g., multiplying by 100). In some embodiments, the segment safety score is based at least in part on other data (e.g., events, maneuvers, video data, lane change frequency, climate data, topology data, road data, number of lanes, etc.). In some embodiments, the segment safety score comprises a linear combination of the speed distribution standard deviation and other data. In some embodiments, a higher safety score indicates that the route segment is less safe.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   an input interface to receive a destination point input by a user at a remote vehicle; and
   a processor to:
   determine a set of segments associated with a route terminating at the destination point;
   determine a plurality of route segment safety scores associated with the set of segments based at least in part on a speed distribution of a group of vehicles and a frequency by which at least one vehicle in the group of vehicles changes lanes including by:
   identifying the group of vehicles within a threshold distance of each other based on at least one of vehicle speed data and vehicle position data collected by sensors in a plurality of vehicles; and
   determining the speed distribution of the group of vehicles based on data collected by sensors in vehicles of the group, wherein the speed distribution includes a distribution of (i) speeds of vehicles in a first sub-group of vehicles travelling through a first location in a route segment and (ii) speeds of vehicles in a second sub-group of vehicles travelling through a second location in the route segment, the second location being different from the first location;
   determine a plurality of routes ending at the destination point;
   determine a route safety score for each of the plurality of routes ending at the destination point including by summing route segment safety scores for the segments making up each route;
   determine a recommended route from among the plurality of routes ending at the destination point based at least in part on a ranking of the route safety scores of the plurality of routes ending at the destination point; and
   output the recommended route to the remote vehicle.

2. The system of claim 1, wherein the speed distribution is determined from at least a first speed reported by a first vehicle in a group of vehicles and a second speed reported by a second vehicle in the group of vehicles.

3. The system of claim 1, wherein the speed distribution includes a plurality of speeds reported by at least one vehicle in the group of vehicles.

4. The system of claim 1, wherein the collected data comprises one or more of the following: event data, speed data, maneuver data, video data, lane change frequency data, climate data, topology data, road data, or number of lanes data.

5. The system of claim 1, wherein the processor is further to determine a route safety score based at least in part on segment safety scores for each segment of the set of segments, and the determination of a recommended route is based on the route safety score.

6. The system of claim 5, wherein the processor is further to determine a comparison of route safety scores of a plurality of routes.

7. The system of claim 5, wherein the processor is further to recommend a route based at least in part on a route safety score.

8. The system of claim 1, wherein the input interface is further to receive a route.

9. The system of claim 1, wherein the input interface is further to receive a plurality of routes.

10. The system of claim 1, wherein the segment safety score is based at least in part on a standard deviation of the speed distribution.

11. The system of claim 1, wherein the speed distribution comprises a distribution of speeds of vehicles within the route segment at a single point in time.

12. The system of claim 1, wherein the speed distribution includes a (i) first vehicle speed for a first vehicle at a first time and a second vehicle speed for the first vehicle at a second time and (ii) a third vehicle speed for a second vehicle at the first time and a fourth vehicle speed for the second vehicle at the second time.

13. The system of claim 1, wherein the speed distribution comprises a distribution of all speed data from within the route segment.

14. The system of claim 1, wherein the segment safety score indicates a safety of the route segment.

15. A method, comprising:
    receiving, by a processor, a destination point input by a user at a remote vehicle;
    determining a set of segments associated with a route terminating at the destination point;
    determining a plurality of route segment safety scores associated with the set of segments based at least in part on a speed distribution of a group of vehicles and a frequency by which at least one vehicle in the group of vehicles changes lanes including by:
    identifying, by the processor, the group of vehicles within a threshold distance of each other based on at least one of vehicle speed data and vehicle position data collected by sensors in a plurality of vehicles; and
    determining, by the processor, the speed distribution of the group of vehicles based on data collected by sensors in vehicles of the group, wherein the speed distribution includes a distribution of (i) speeds of vehicles in a first sub-group of vehicles travelling through a first location in a route segment and (ii) speeds of vehicles in a second sub-group of vehicles travelling through a second location in the route segment, the second location being different from the first location;
    determining a plurality of routes ending at the destination point;
    determining a route safety score for each of the plurality of routes ending at the destination point including by summing route segment safety scores for the segments making up each route;
    determining a recommended route from among the plurality of routes ending at the destination point based at least in part on a ranking of the route safety scores of the plurality of routes ending at the destination point; and outputting the recommended route to the remote vehicle.

16. A computer program product embodied in a non-transitory computer readable storage medium and comprising computer instructions for:

receiving a destination point input by a user at a remote vehicle;

determining a set of segments associated with a route terminating at the destination point;

determining a plurality of route segment safety scores associated with the set of segments based at least in part on a speed distribution of a group of vehicles and a frequency by which at least one vehicle in the group of vehicles changes lanes including by:

identifying the group of vehicles within a threshold distance of each other based on at least one of vehicle speed data and vehicle position data collected by sensors in a plurality of vehicles; and determining the speed distribution of the group of vehicles based on data collected by sensors in vehicles of the group, wherein the speed distribution includes a distribution of (i) speeds of vehicles in a first sub-group of vehicles travelling through a first location in a route segment and (ii) speeds of vehicles in a second sub-group of vehicles travelling through a second location in the route segment, the second location being different from the first location;

determine a plurality of routes ending at the destination point;

determine a route safety score for each of the plurality of routes ending at the destination point including by summing route segment safety scores for the segments making up each route;

determining a recommended route from among the plurality of routes ending at the destination point based at least in part on a ranking of the route safety scores of the plurality of routes ending at the destination point; and outputting the recommended route to the remote vehicle.

* * * * *

UNITED STATES PATENT AND TRADEMARK OFFICE
CERTIFICATE OF CORRECTION

PATENT NO. : 10,520,321 B1
APPLICATION NO. : 14/965018
DATED : December 31, 2019
INVENTOR(S) : Muskan Kukreja It is certified that error appears in the above-identified patent and that said Letters Patent is hereby corrected as shown below:

On the Title Page

Item (57) Abstract, Line 1, delete "and" and insert --an--, therefor.

Signed and Sealed this
Eighteenth Day of August, 2020

Andrei Iancu
*Director of the United States Patent and Trademark Office*